US011597612B2

(12) United States Patent
Newberg et al.

(10) Patent No.: US 11,597,612 B2
(45) Date of Patent: Mar. 7, 2023

(54) SLIDE RACK GRIPPER APPARATUS

(71) Applicant: Leica Biosystems Imaging, Inc., Vista, CA (US)

(72) Inventors: Nicholas Newberg, San Marcos, CA (US); Prentash Djelosevic, Oceanside, CA (US); David Rybka, Fallbrook, CA (US)

(73) Assignee: LEICA BIOSYSTEMS IMAGING, INC., Vista, CA (US)

( * ) Notice: Subject to any disclaimer, the term of this patent is extended or adjusted under 35 U.S.C. 154(b) by 594 days.

(21) Appl. No.: 16/624,196

(22) PCT Filed: Nov. 30, 2018

(86) PCT No.: PCT/US2018/063461
§ 371 (c)(1),
(2) Date: Dec. 18, 2019

(87) PCT Pub. No.: WO2019/109028
PCT Pub. Date: Jun. 6, 2019

(65) Prior Publication Data
US 2020/0109015 A1  Apr. 9, 2020

Related U.S. Application Data

(60) Provisional application No. 62/593,135, filed on Nov. 30, 2017.

(51) Int. Cl.
*B65G 47/90*        (2006.01)
*B25J 9/00*         (2006.01)
(Continued)

(52) U.S. Cl.
CPC .......... *B65G 47/902* (2013.01); *B25J 9/0093* (2013.01); *B25J 15/0028* (2013.01);
(Continued)

(58) Field of Classification Search
None
See application file for complete search history.

(56) References Cited

U.S. PATENT DOCUMENTS

| 6,592,324 B2 | 7/2003 | Downs et al. |
| 6,932,557 B2 | 8/2005 | Downs et al. |
| (Continued) | | |

FOREIGN PATENT DOCUMENTS

| AU | 2018374379 B2 | 3/2021 |
| CN | 111344574 A   | 6/2020 |
| (Continued) | | |

OTHER PUBLICATIONS

Office Action in EP 18884764.4 dated Jan. 17, 2022, in 12 pages.
(Continued)

*Primary Examiner* — Matthew D Krcha
(74) *Attorney, Agent, or Firm* — Frost Brown Todd LLP

(57) ABSTRACT

A slide rack gripper apparatus is provided that simultaneously conveys a plurality of glass slides in the protection of a slide rack within a digital slide scanning apparatus. The slide rack gripper apparatus conveys the plurality of glass slides from a slide rack carousel to a scanning stage for processing. The slide rack gripper includes a first motor attached to a base configured to drive a finger mount attached to the base along a first linear axis. The slide rack gripper apparatus also includes a second motor attached to the finger mount and configured to drive opposing gripper fingers attached to the finger mount along a second linear axis. The second motor is also configured to drive individual gripper fingers along a third linear axis to move the gripper fingers toward each other and away from each other to grasp or release a slide rack.

20 Claims, 7 Drawing Sheets

(51) Int. Cl.
  *B25J 15/00* (2006.01)
  *G01N 21/64* (2006.01)
  *G01N 35/00* (2006.01)
  *G01N 35/04* (2006.01)

(52) U.S. Cl.
  CPC ........ *B25J 15/0033* (2013.01); *G01N 21/645* (2013.01); *G01N 35/00029* (2013.01); *G01N 35/0099* (2013.01); *G01N 35/04* (2013.01); *G01N 2035/0441* (2013.01)

(56) References Cited

U.S. PATENT DOCUMENTS

| | | |
|---|---|---|
| 7,422,411 B2 | 9/2008 | Downs et al. |
| 7,952,798 B2 | 5/2011 | Ljungmann et al. |
| 8,498,049 B2 | 7/2013 | Ljungmann et al. |
| 8,622,681 B2 | 1/2014 | Rippl et al. |
| 8,722,412 B2 | 5/2014 | Egle et al. |
| 8,752,783 B2 | 6/2014 | Lin et al. |
| 8,796,186 B2 | 8/2014 | Shirazi |
| 9,362,152 B2 | 6/2016 | Wada et al. |
| 2003/0114961 A1* | 6/2003 | Riff .................. B25J 9/104 700/245 |
| 2004/0086368 A1 | 5/2004 | Downs et al. |
| 2008/0014119 A1 | 1/2008 | Metzner |
| 2012/0148380 A1 | 6/2012 | Wilke |
| 2012/0286531 A1* | 11/2012 | Hajrovic .............. B25J 15/0033 294/192 |
| 2012/0290127 A1* | 11/2012 | Neef ................. G01N 35/00029 700/228 |

FOREIGN PATENT DOCUMENTS

| | | |
|---|---|---|
| JP | S59-71018 A | 4/1984 |
| JP | 2012-177803 A | 9/2012 |
| JP | 2012-242384 A | 12/2012 |
| JP | 2014-526712 A | 10/2014 |
| JP | 2021-503098 A | 2/2021 |
| WO | WO 2019/109028 A1 | 6/2019 |

OTHER PUBLICATIONS

Notice of Allowance in Australian Application No. 2018374379 dated Feb. 17, 2021, in 3 pages.
Extended European Search Report for EP 18884764.4 dated Feb. 2, 2021 in 11 pages.
Notice of Reasons for Refusal in Japanese Application No. 2020-524845 dated Jun. 28, 2021, in 13 pages.
Office Action in Japanese Application No. 2020-524845 dated Mar. 4, 2022, in 6 pages.
International Search Report and Written Opinion issued in International Application No. PCT/US2018/063461 dated Feb. 8, 2019 in 15 pages.

* cited by examiner

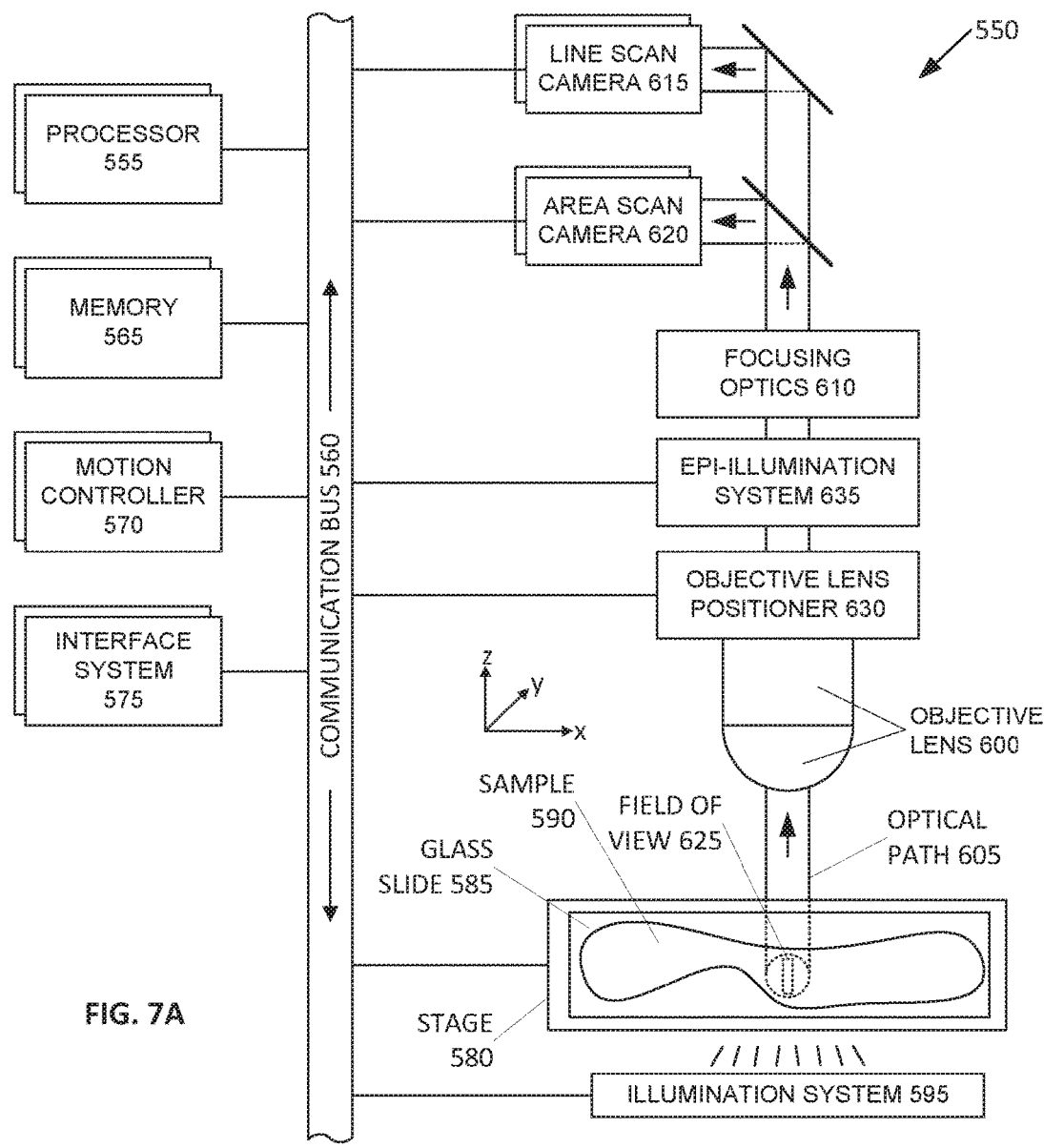
FIG. 7A
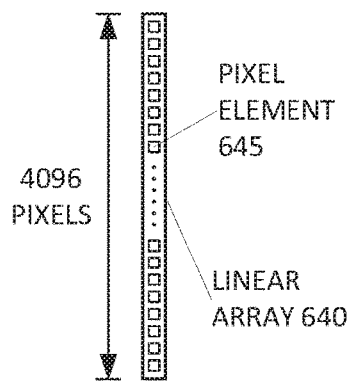
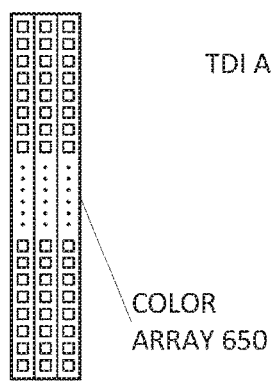
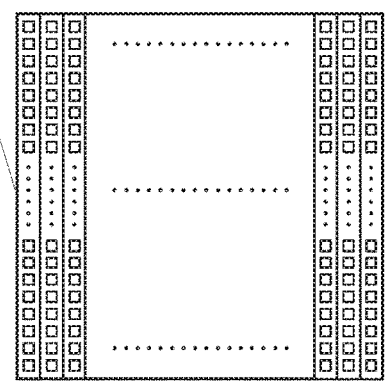
FIG. 7B  FIG. 7C  FIG. 7D

SLIDE RACK GRIPPER APPARATUS

CROSS-REFERENCE TO RELATED APPLICATIONS

This application claims priority to U.S. Provisional Patent Application No. 62/593,135, filed on Nov. 30, 2017, which is hereby incorporated herein by reference as if set forth in full.

BACKGROUND

Field of the Invention

The present invention generally relates to a digital slide scanning apparatus and more particularly relates to an internal slide rack gripper apparatus that conveys glass slides in bulk from a carousel to a scanning stage for processing by the digital slide scanning apparatus.

Related Art

Digital pathology is an image-based information environment which is enabled by computer technology that allows for the management of information generated from a physical slide. Digital pathology is enabled in part by virtual microscopy, which is the practice of scanning a specimen on a physical glass slide and creating a digital slide image that can be stored, viewed, managed, and analyzed on a computer monitor. With the capability of imaging an entire glass slide, the field of digital pathology has exploded and is currently regarded as one of the most promising avenues of diagnostic medicine in order to achieve even better, faster and cheaper diagnosis, prognosis and prediction of important diseases such as cancer.

Some digital slide scanning apparatus have been modified to hold plural slide racks so that the digital slide scanning apparatus can sequentially process tens or hundreds of glass slides without interruption. However, conveyance of individual glass slides from the slide rack to the scanning stage remains a significant challenge. Therefore, what is needed is a system and method that overcomes these significant problems found in the conventional systems as described above.

SUMMARY

Accordingly, described herein is a slide rack gripper apparatus that conveys glass slides in bulk and in the protection of the slide rack within the digital slide scanning apparatus. The slide rack gripper includes a first motor attached to a base and operatively coupled to a finger mount secured to the base so that the first motor drives the finger mount along a first linear finger mount axis. The slide rack gripper apparatus also includes a second motor that is supported by and operatively coupled to the finger mount and configured to drive opposing gripper fingers along a second linear gripper finger axis. The second motor may also be configured to drive the individual gripper fingers along a third linear axis to move the gripper fingers toward each other and away from each other to grasp or release a slide rack.

In an embodiment, a method comprises storing a plurality of slide racks in a slide rack carousel operatively coupled with a digital slide scanner apparatus, wherein each slide rack supports a plurality of glass slides and conveying a first glass slide to a scanning stage of the digital slide scanner apparatus by: driving a first gripper finger attached to a finger mount of a slide rack gripper and a second gripper finger attached to the finger mount along a linear gripper finger grasp axis to a predetermined distance between a slide rack engagement surface of the first gripper finger and a slide rack engagement surface of the second gripper finger, and driving the finger mount along a first linear finger mount axis to position the first gripper finger in a first rack spacer recess on a first side of a first slide rack supporting the first slide and to position the second gripper finger in a second rack spacer recess on a second side of the first slide rack. Subsequent to the first gripper finger and the second gripper finger being positioned on respective first and second sides of the first slide rack, the method includes driving the first gripper finger and the second gripper finger toward each other along the linear gripper finger grasp axis to bring the slide rack engagement surface of the first gripper finger in contact with a first surface of the first slide rack and to bring the slide rack engagement surface of the second gripper finger in contact with a second surface of the first slide rack. Subsequent to contact between the respective slide rack engagement surfaces of the first and second gripper fingers and the first and second surfaces of the first slide rack, the method includes driving the finger mount along the first linear finger mount axis to remove the first slide rack from the slide rack carousel, and subsequent to removing the first slide rack from the slide rack carousel, conveying the first slide rack toward the scanning stage.

In an embodiment, a slide rack gripper apparatus includes a base, a finger mount attached to the base and configured to move along a first linear axis, a first motor attached to the base and configured to drive the finger mount along the first linear axis, a plurality of gripper fingers attached to the finger mount and configured to move along a second linear axis and a third linear axis, wherein each gripper finger comprises a slide rack engagement surface and the slide rack engagement surface of a first gripper finger faces the slide rack engagement surface of a second gripper finger along the third linear axis, and a second motor attached to the finger mount and configured to drive the plurality of gripper fingers along the second linear axis, the second motor further configured to drive the first gripper finger and the second gripper finger in opposite directions along the third linear axis to grasp or release a slide rack.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which:

FIG. 7A is a block diagram illustrating an example processor enabled device 550 that may be used in connection with various embodiments described herein;

FIG. 7B is a block diagram illustrating an example line scan camera having a single linear array;

FIG. 7C is a block diagram illustrating an example line scan camera having three linear arrays; and FIG. 7D is a block diagram illustrating an example line scan camera having a plurality of linear arrays.

DETAILED DESCRIPTION

Certain embodiments disclosed herein provide for a slide rack gripper that removes different size slide racks from a slide rack carousel and positions the removed slide rack for further processing by the digital scanning apparatus. The slide rack gripper also obtains processed slide racks of different sizes and inserts the processed slide rack into the slide rack carousel. After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

1. Example Slide Rack Carousel

Figure 1A:
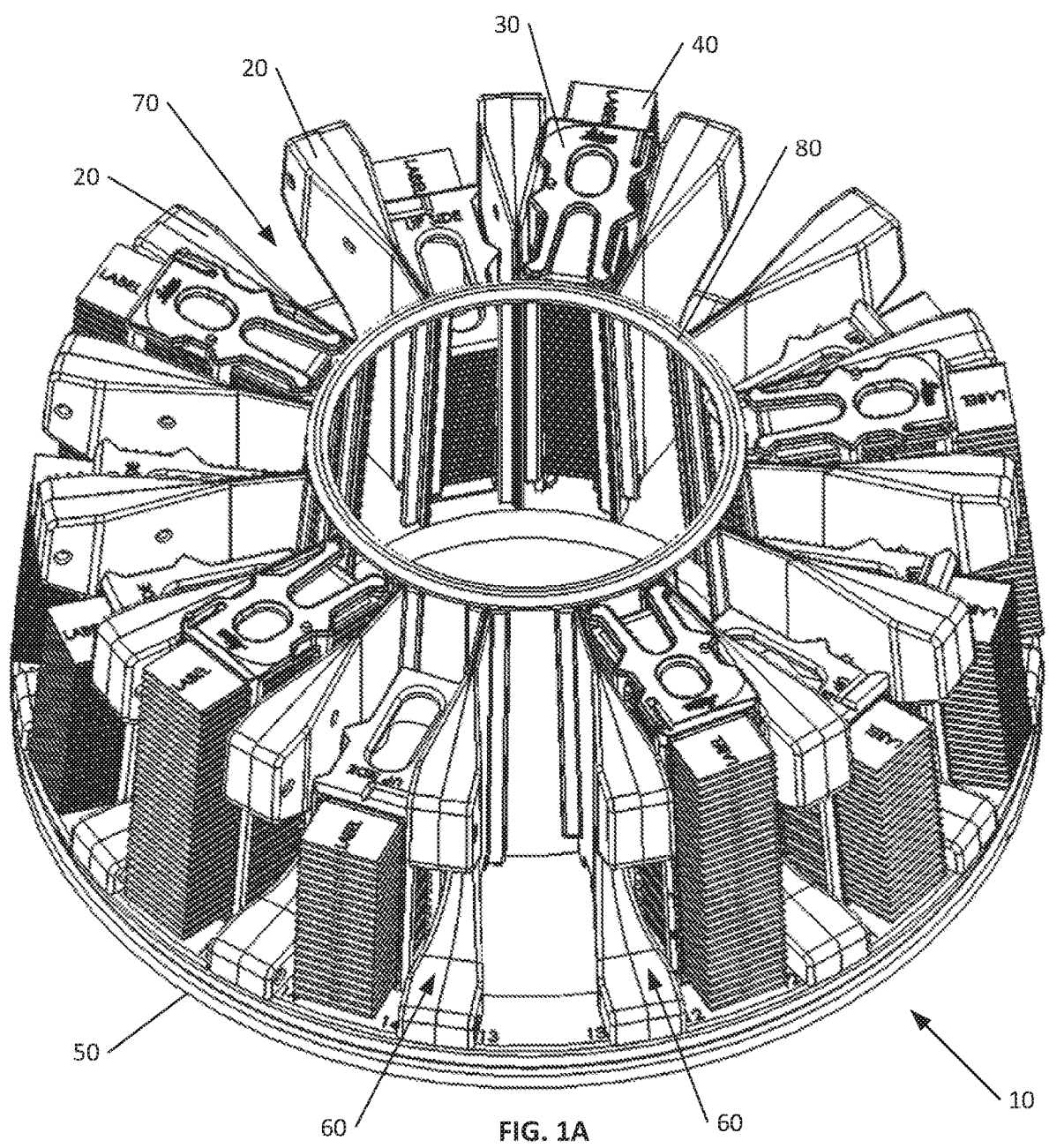
FIG. 1A is a perspective view diagram illustrating an example slide rack carousel with rack spacers and slide racks with glass slides according to an embodiment of the invention.

FIG. 1A is a perspective view diagram illustrating an example slide rack 30 carousel 10 with rack spacer 20s and slide racks 30 with glass slides 40 according to an embodiment of the invention. In the illustrated embodiment, the carousel 10 comprises a plurality of rack spacer 20s that are attached to the upper surface of a carousel base 50 and extend upward from the upper surface of the carousel base 50. In an embodiment, each rack spacer 20 includes a rack spacer recess 60 configured to allow the hands of an operator insert or remove a slide rack 30 from the carousel 10 and/or allow portions of a slide rack 30 gripper insert or remove a slide rack 30 from the carousel 10. Adjacent rack spacer 20s define a rack slot 70 into which a slide rack 30 can be positioned such that a slide rack 30 rests primarily on the upper surface of the carousel base 50. In one embodiment, the upper surface of the carousel base 50 is angled downward from an exterior region of the carousel base 50 toward a central region of the carousel base 50. Glass slides 40 occupy various slots in the slide rack 30 and in one embodiment the glass slides 40 are advantageously positioned at an angle in accordance with the angle of the upper surface of the carousel base 50 and the corresponding angle of the slide rack 30. Additionally, the carousel 10 comprises a central ring that is secured to an upper portion of each of the plurality of rack spacer 20s.

Figure 1B:
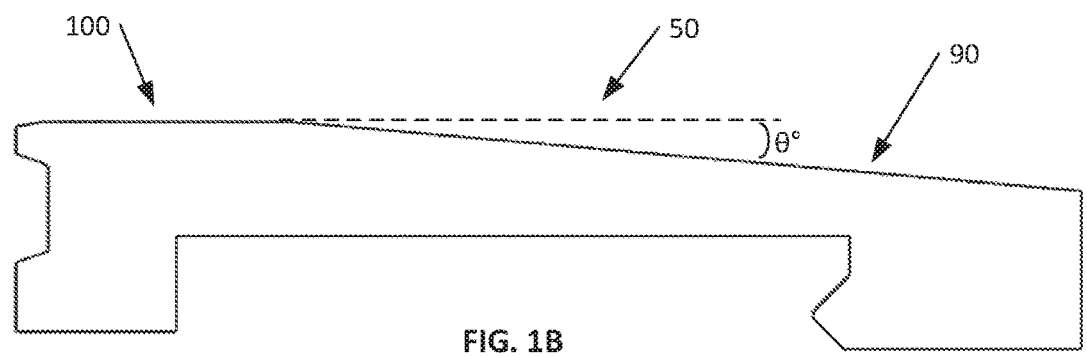
FIG. 1B is a side view diagram illustrating an example cross section of one side of a slide rack carousel base according to an embodiment of the invention.

FIG. 1B is a side view diagram illustrating an example cross section of one side of a slide rack 30 carousel base 50 according to an embodiment of the invention. In the illustrated embodiment, a portion of the upper surface of the carousel base 50 is flat. This portion of the upper surface is near the perimeter of the upper surface of the carousel base 50. Additionally, a different portion of the upper surface of the carousel base 50 is angled at an angle of 0°. Advantageously, at least a portion of the upper surface of the carousel base 50 is angled and the degree of the angle, 0°, may range from 1° to 10°, or even higher up to 45°. Advantageously, when a slide rack 30 is positioned on the angled upper surface 90 of the base 50, any vibration induced or other movement of the slide rack 30 is biased toward the center of the carousel 10 where slide rack 30 stoppers prevent further movement of the slide rack 30. Additionally, the individual slides in the slide rack 30 may also experience vibration induced movement or other movement and the angled position of the slide rack 30 in which an individual slide is disposed also positions the individual slide at an angle such that movement of the individual slide is biased toward the center of the carousel 10 where the end of the slide rack 30 prevents further movement of the slide rack 30.

2. Example Slide Racks 30

Figure 2:
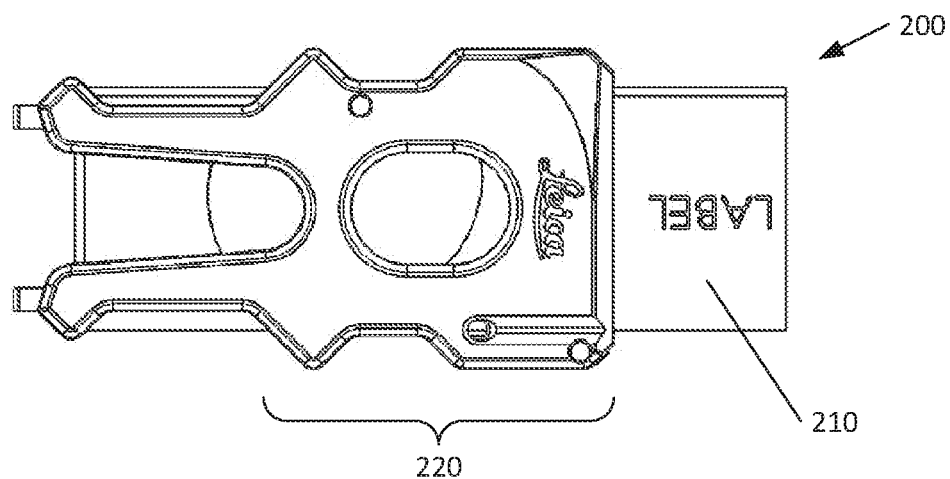
FIG. 2 is a top view diagram illustrating an example 1×3 slide rack with glass slides from a first manufacturer according to an embodiment of the invention.

FIG. 2 is a top view diagram illustrating an example 1×3 slide rack 200 with glass slides 210 from a first manufacturer according to an embodiment of the invention. In the illustrated embodiment, the 1×3 slide rack 200 comprises one or more slide rack protrusions 220 that extend outward from the side of the 1×3 slide rack 200.

Figure 3:
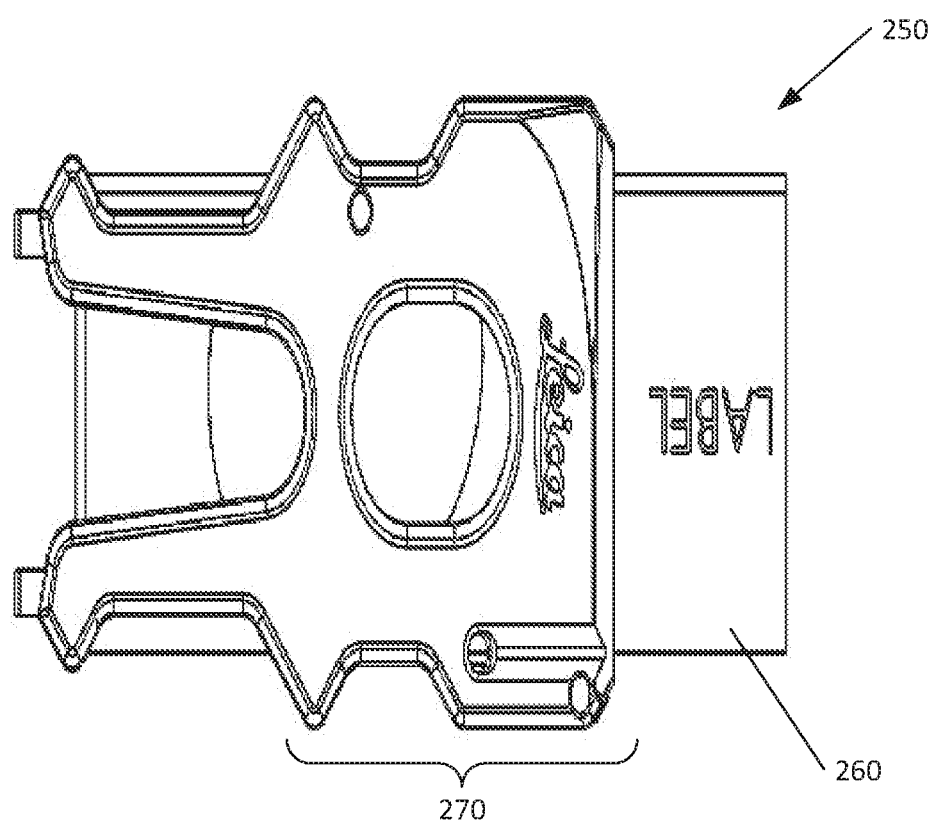
FIG. 3 is a top view diagram illustrating an example 2×3 slide rack with glass slides from a first manufacturer according to an embodiment of the invention.

FIG. 3 is a top view diagram illustrating an example 2×3 slide rack 250 with glass slides 260 from a first manufacturer according to an embodiment of the invention. In the illustrated embodiment, the 2×3 slide rack 250 comprises one or more slide rack protrusions 270 that extend outward from the side of the 2×3 slide rack 250.

Figure 4:
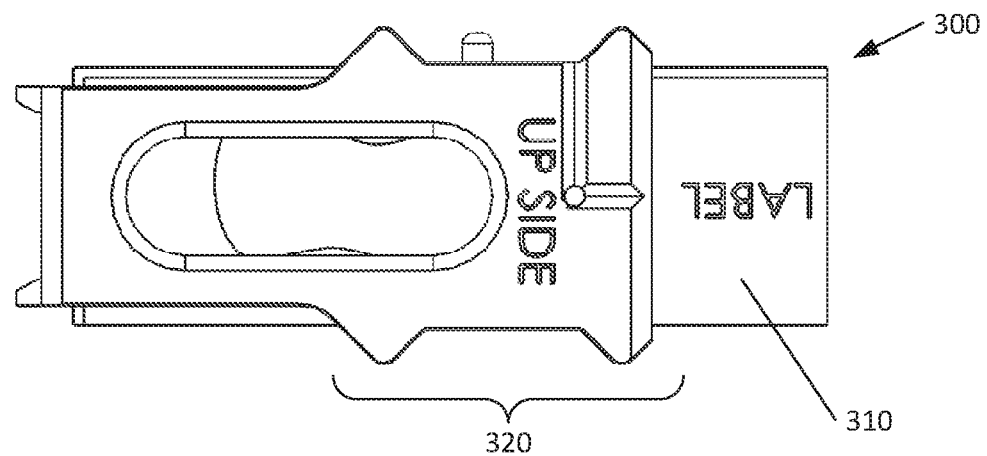
FIG. 4 is a top view diagram illustrating an example 1×3 slide rack with glass slides from a second manufacturer according to an embodiment of the invention.

FIG. 4 is a top view diagram illustrating an example 1×3 slide rack 300 with glass slides 310 from a second manufacturer according to an embodiment of the invention. In the illustrated embodiment, the 1×3 slide rack 300 comprises one or more slide rack protrusions 330 that extend outward from the side of the 1×3 slide rack 300.

Figure 5:
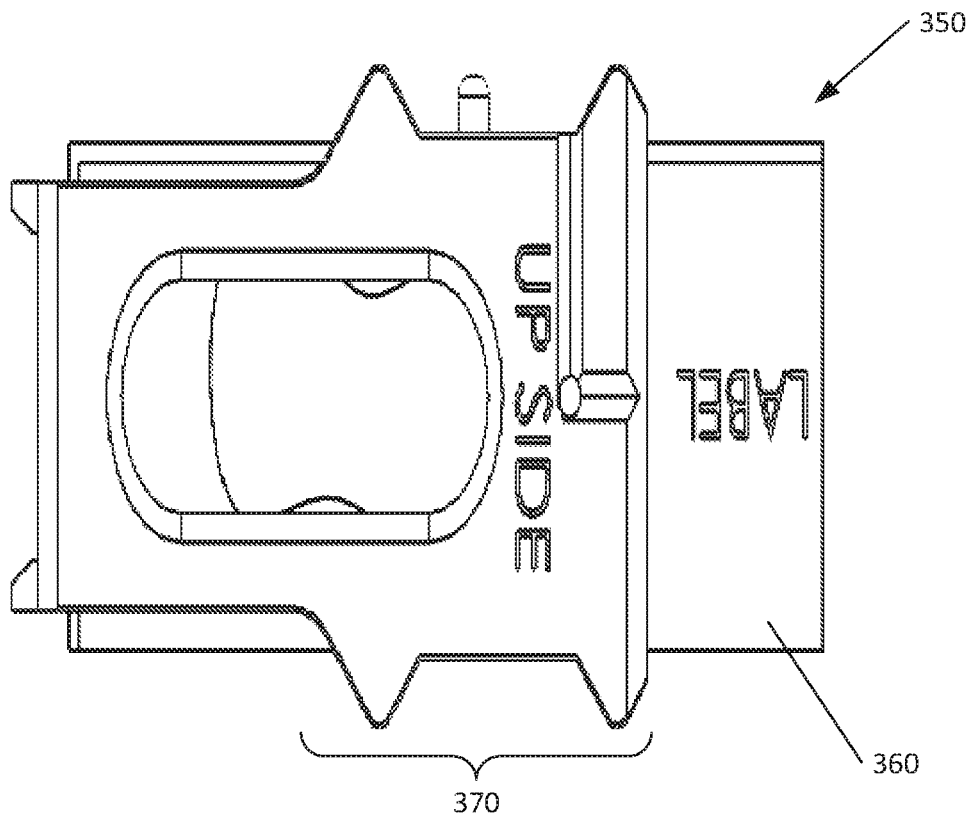
FIG. 5 is a top view diagram illustrating an example 2×3 slide rack with glass slides from a second manufacturer according to an embodiment of the invention.

FIG. 5 is a top view diagram illustrating an example 2×3 slide rack 350 with glass slides 360 from a second manufacturer according to an embodiment of the invention. In the illustrated embodiment, the 2×3 slide rack 350 comprises one or more slide rack protrusions 370 that extend outward from the side of the 2×3 slide rack 350.

3. Example Gripper Apparatus

Figure 6A:
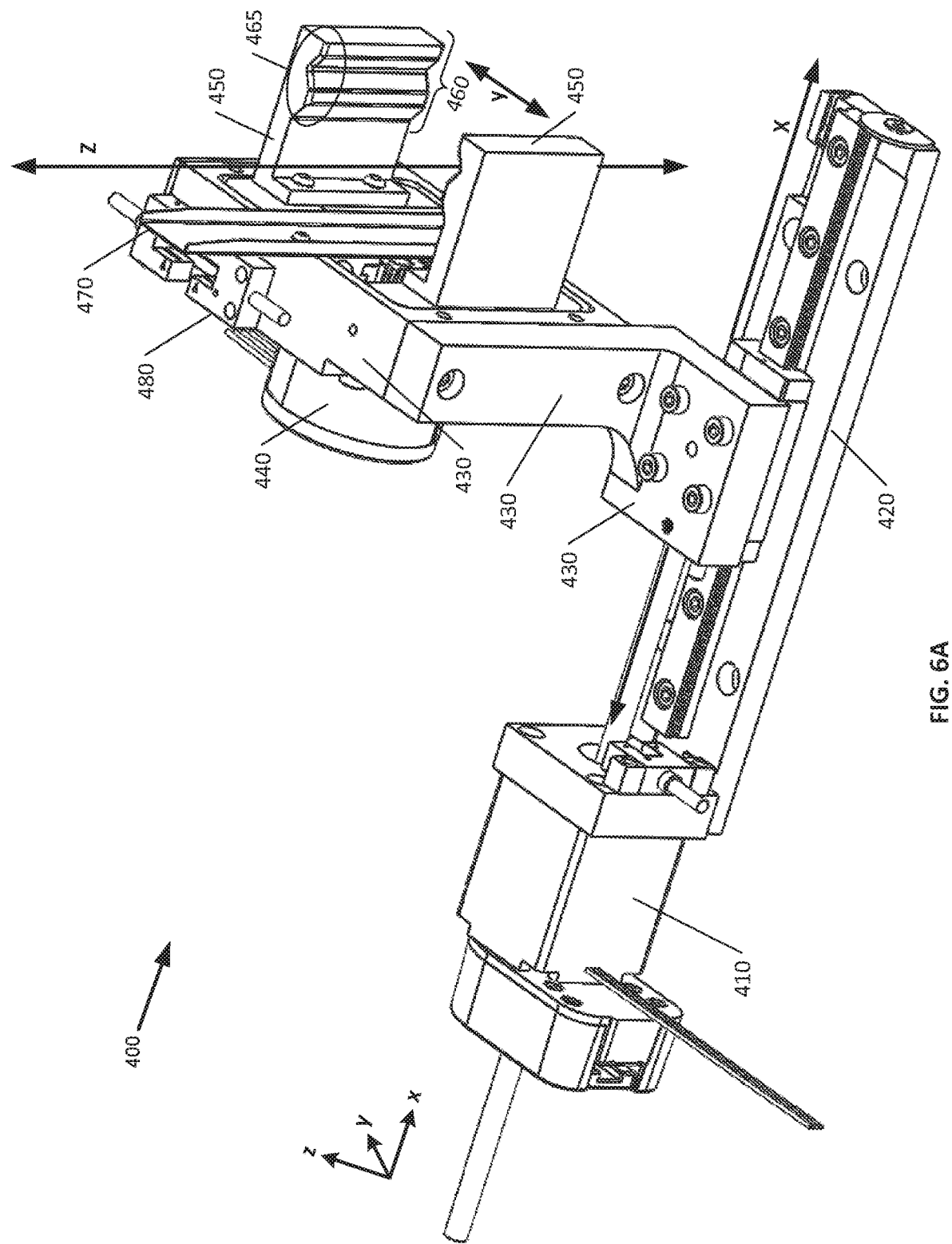
FIG. 6A is a perspective view diagram illustrating an example slide rack gripper apparatus according to an embodiment of the invention.

FIG. 6A is a perspective view diagram illustrating an example slide rack gripper apparatus 400 according to an embodiment of the invention. In the illustrated embodiment, the slide rack gripper apparatus 400 includes a first motor 410 (referred to herein as a gripper motor) that is attached to a base. The base 420 supports a finger mount 430 that extends upward from the base 420. The gripper motor 410 is configured to move the finger mount 430 along a linear finger mount 430 axis, which moves the finger mount 430 toward and away from a carousel that houses a plurality of slide racks 30.

The finger mount 430 supports a second motor 440 (referred to herein as a finger motor). The finger motor 440 is configured to move the gripper fingers 450 along a linear gripper finger 450 height axis to appropriately position the height of the gripper fingers 450 for inserting a slide rack 30 into the carousel 10 or for engaging a slide rack 30 in the carousel 10 and removing the slide rack 30 from the carousel 10. The finger motor 440 is also configured to move the gripper fingers 450 along a linear gripper finger 450 grasp axis. Advantageously, when moving the gripper fingers 450 along the linear gripper finger 450 grasp axis, each gripper finger 450 moves toward the other gripper finger 450 or away from the other gripper finger 450 to increase or decrease the distance between the gripper fingers 450. Each gripper finger 450 includes a slide rack 30 engagement surface and each slide rack 30 engagement surface includes one or more finger protrusions 465 configured to engage one or more corresponding slide rack 30 protrusions extending from a side of the slide rack 30. In one embodiment, the slide rack 30 is positioned at an angle in the slide rack 30 and the one or more finger protrusions 465 are configured to engage the one or more corresponding slide rack 30 protrusions extending from the side of the slide rack 30 even when the slide rack 30 is positioned at an angle.

The finger mount 430 also supports a slide retainer 470 that is positioned between the two gripper fingers 450 and extends along the gripper finger 450 height axis above and below the gripper fingers 450. In one embodiment, the length of the slide retainer 470 is at least as long as the height of a slide rack 30. A more refined length may be the length of the range from a top-most glass slide 40 within a slide rack 30 to a bottom-most glass slide 40 within a slide rack 30. The slide retainer 470 is configured to keep the glass slides 40 in the slide rack 30 during transport. For example, the slide retain prevents glass slides 40 from exiting the slide rack 30 during removal of the slide rack 30 from the slide rack 30 carousel 10 and during insertion of the slide rack 30 into the slide rack 30 carousel 10.

The finger mount 430 also supports one or more slide rack sensor 480s that are positioned and configured to sense the presence of a slide rack 30 between the gripper fingers 450. In one embodiment, a processor analyzes the signal(s) from the slide rack sensor 480(s) to determine a type (e.g., manufacturer and size) of slide rack 30 and whether or not the determined type of slide rack 30 is supported.

Figure 6B:
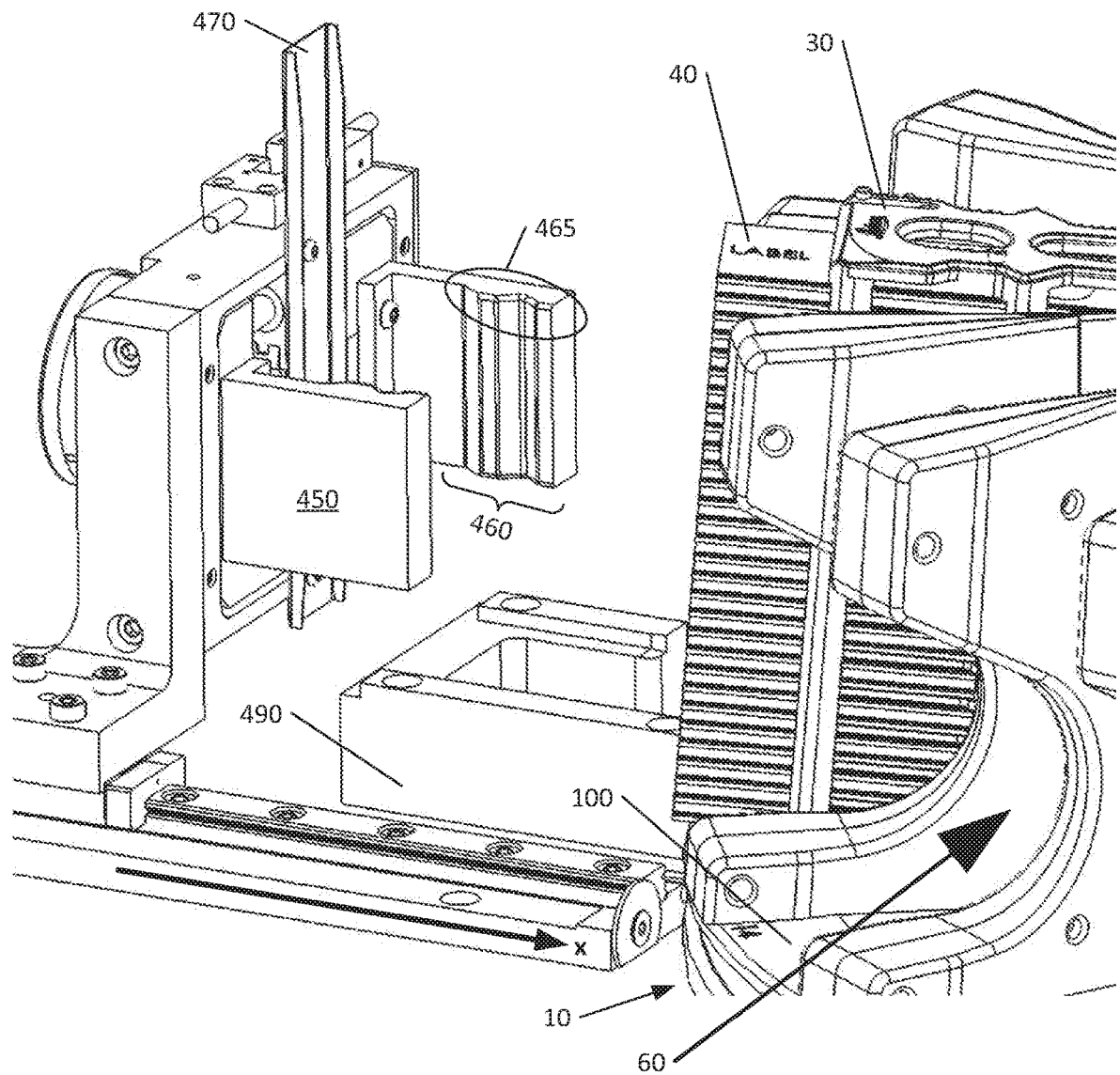
FIG. 6B is a perspective view diagram illustrating an example slide rack gripper apparatus driving gripper fingers toward a slide rack in a carousel according to an embodiment of the invention.

FIG. 6B is a perspective view diagram illustrating an example slide rack 30 gripper apparatus driving gripper fingers 450 toward a slide rack 30 in a carousel according to an embodiment of the invention. In the illustrated embodiment, the gripper motor 410 drives the finger mount 430 that supports the gripper fingers 450 and the slide retainer 470 toward the carousel 10. The height of the gripper fingers 450 is adjusted by the finger motor 440 as needed to position the gripper fingers 450 within respective rack spacer recess 60es on either side of the slide rack 30 to be grasped when the gripper motor 410 positions the finger mount 430 proximal the carousel 10. The height of the slide retainer 470 is similarly positioned to secure all of the glass slides 40 in the slide rack 30 during transport.

In one embodiment, a processor controls the gripper apparatus to grasp a slide rack 30 that is positioned on the angled upper surface 90 portion of the carousel base 50. The gripper apparatus is controlled to initially grasp the slide rack 30 at less than 100% of a predetermined gripping pressure and pull the slide rack 30 a certain distance out of the carousel 10 to the region of the carousel base 50 having the flat upper surface 100 portion. At this position, the processor controls the gripper apparatus to grasp the slide rack 30 at 100% of the predetermined gripping pressure and then pull the slide rack 30 the rest of the way out of the carousel 10 to position the slide rack 30 on the slide rack platform 490 for further processing by the digital slide scanning apparatus.

Figure 6C:
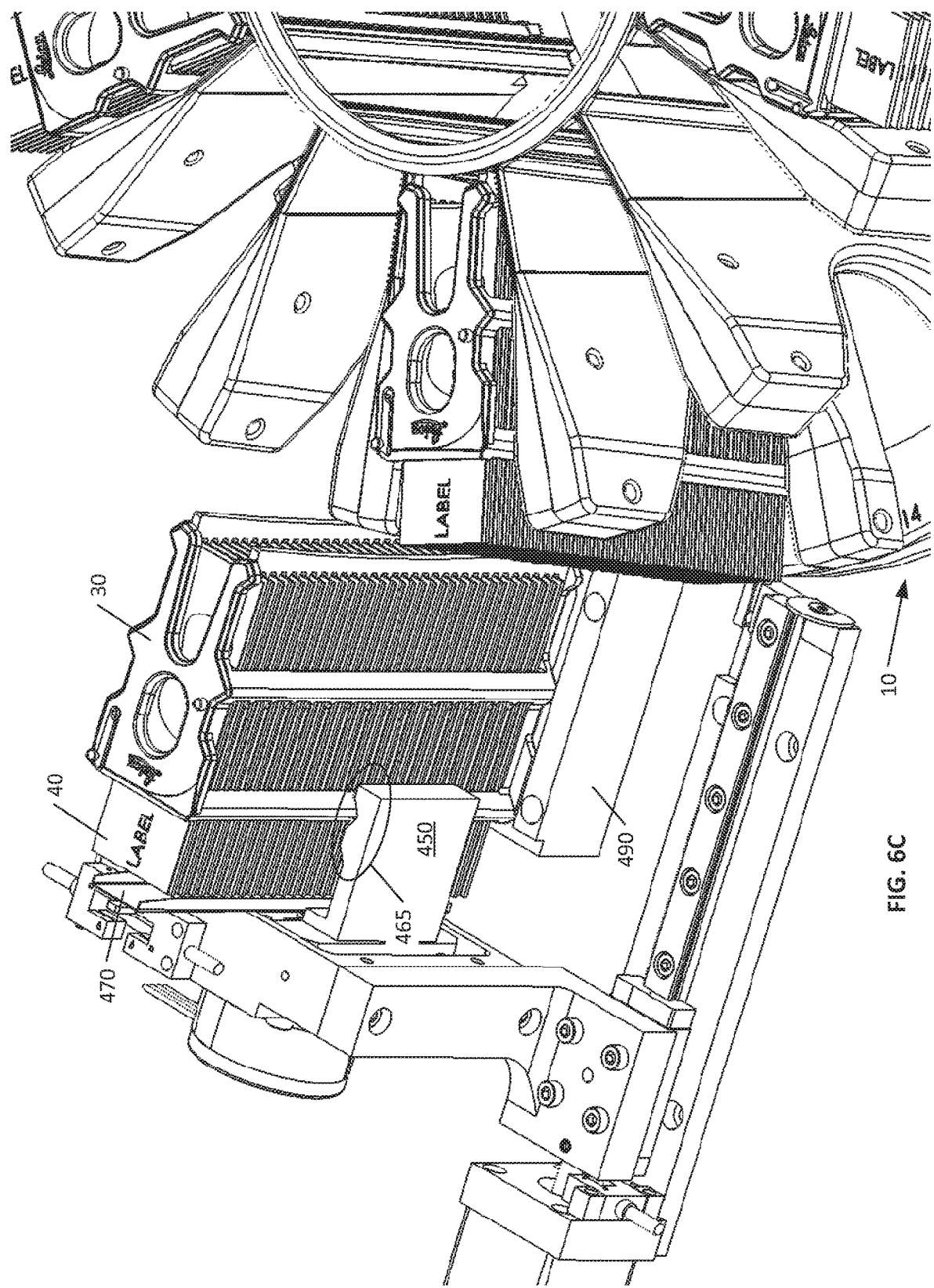
FIG. 6C is a perspective view diagram illustrating an example slide rack gripper apparatus with gripper fingers engaged with a slide rack positioned on a slide rack platform according to an embodiment of the invention.

FIG. 6C is a perspective view diagram illustrating an example slide rack 30 gripper apparatus with gripper fingers 450 engaged with a slide rack 30 positioned on a slide rack platform 490 according to an embodiment of the invention. In the illustrated embodiment, the slide rack 30 positioned on the slide rack platform 490 has either just been removed from the slide rack 30 carousel 10 or is about to be inserted into the slide rack 30 carousel 10. Although no glass slides 40 are illustrated in the slots of the slide rack 30, the slide retainer 470 is positioned to secure the glass slides 40 in the slide rack 30 during transport. As shown in the illustrated embodiment, the finger protrusions 465 on the engagement surface of the gripper finger 450 engage with a side protrusion of the slide rack 30 to securely clamp the slide rack 30 between opposing gripper fingers 450 when inserting a slide rack 30 into the carousel 10 or when removing a slide rack 30 from the carousel 10.

Advantageously, after processing of the slides in the slide rack 30 by the digital slide scanning apparatus, the slide rack 30 is returned to the slide rack platform 490. The gripper fingers 450 of the gripper apparatus are configured to grasp the slide rack 30 that is positioned level on the slide rack platform 490. Notably, the gripper fingers 450 are configured to grasp a slide rack 30 that is positioned at an angle on the angled upper surface 90 portion of the slide rack 30 carousel base 50 and are also configured to grasp a slide rack 30 that is positioned level on the flat surface of the slide rack platform 490.

4. Example Embodiments

In one embodiment, a slide rack 30 gripper apparatus of a digital slide scanner apparatus includes a base and a finger mount 430 attached to the base 420. The finger mount 430 is configured to move along a first linear axis, which may be referred to as the finger mount 430 axis. The slide rack 30 gripper apparatus also includes a first motor 410 attached to the base 420 and configured to drive the finger mount 430 along the first linear axis. The slide rack 30 gripper apparatus also includes a plurality of gripper fingers 450 attached to the finger mount 430. The gripper fingers 450 are configured to move along a second linear axis and a third linear axis. The second linear axis may be referred to as the gripper finger 450 height axis and the third linear axis may be referred to as the gripper finger 450 grasp axis. In this embodiment, each gripper finger 450 comprises a slide rack 30 engagement surface and the slide rack 30 engagement surface of a first gripper finger 450 faces the slide rack 30 engagement surface of a second gripper finger 450 along the third linear axis. The slide rack 30 gripper apparatus also includes a second motor 440 attached to the finger mount 430 and configured to drive the plurality of gripper fingers 450 along the second linear axis and further configured to drive the first gripper finger 450 and the second gripper finger 450 in opposite directions along the third linear axis to grasp or release a slide rack 30.

In one embodiment, the slide rack 30 engagement surface of the first gripper finger 450 comprises one or more finger protrusions 465 configured to engage one or more slide rack 30 protrusions extending from a first side of the slide rack 30. In this same embodiment, the slide rack 30 engagement surface of the second gripper finger 450 comprises one or more finger protrusions 465 configured to engage one or more slide rack 30 protrusions extending from a second of the slide rack 30. In one embodiment, each of the plurality of gripper fingers 450 comprises one or more finger protrusions 465 on its respective slide rack 30 engagement surface. Advantageously, in one embodiment, the one or more finger protrusions 465 of each of the plurality of gripper fingers 450 are configured to grasp the one or more slide rack 30 protrusions extending from a side of the slide rack 30 when the first slide rack 30 is positioned at an angle in the carousel 10.

In one embodiment, the first linear axis is orthogonal to the second linear axis and the third linear axis. In one embodiment, the second linear axis is orthogonal to the first linear axis and the third linear axis. In one embodiment, the third linear axis is orthogonal to the first linear axis and the second linear axis. In one embodiment, each linear axis is orthogonal to the other two linear axes.

In one embodiment a method of conveying a first slide to from a slide rack 30 carousel 10 to a slide scanning state in a digital slide scanning apparatus comprises storing a plurality of slide racks 30 in the slide rack 30 carousel 10. The slide rack 30 carousel 10 is integrated with and/or operatively coupled with the digital slide scanner apparatus. Advantageously, each slide rack 30 supports a plurality of glass slides 40 and the first slide is supported by a first slide rack 30 in the slide rack 30 carousel 10.

The method additional includes conveying the first glass slide 40 to the scanning stage of the digital slide scanner apparatus by driving a first gripper finger 450 attached to a finger mount 430 of a slide rack 30 gripper and a second gripper finger 450 attached to the finger mount 430 along a linear gripper finger 450 grasp axis to a predetermined distance between a slide rack 30 engagement surface of the first gripper finger 450 and a slide rack 30 engagement surface of the second gripper finger 450. The method also includes driving the finger mount 430 along a first linear finger mount 430 axis to position the first gripper finger 450 in a first rack spacer recess 60 on a first side of a first slide rack 30 supporting the first slide and to position the second gripper finger 450 in a second rack spacer recess 60 on a second side of the first slide rack 30. Subsequent to the first gripper finger 450 and the second gripper finger 450 being positioned on respective first and second sides of the first slide rack 30, the method also includes driving the first gripper finger 450 and the second gripper finger 450 toward each other along the linear gripper finger 450 grasp axis to bring the slide rack 30 engagement surface of the first gripper finger 450 in contact with a first surface of the first slide rack 30 and to bring the slide rack 30 engagement surface of the second gripper finger 450 in contact with a second surface of the first slide rack 30;

Subsequent to contact between the respective slide rack 30 engagement surfaces of the first and second gripper fingers 450 and the first and second surfaces of the first slide rack 30, the method also includes driving the finger mount 430 along the first linear finger mount 430 axis to remove the first slide rack 30 from the slide rack 30 carousel 10. And subsequent to removing the first slide rack 30 from the slide rack 30 carousel 10, the method also includes conveying the first slide rack 30 toward the scanning stage.

In one embodiment, driving the two or more gripper fingers 450 along the gripper finger 450 grasp axis also includes driving the two or more gripper fingers 450 toward each other. In one embodiment, driving the two or more gripper fingers 450 along the gripper finger 450 grasp axis includes driving the two or more gripper fingers 450 away from each other.

5. Example Digital Slide Scanning Apparatus

The various embodiments described herein may be implemented using a digital pathology scanning device such as described with respect to FIGS. 7A-7D.

FIG. 7A is a block diagram illustrating an example processor enabled device 550 that may be used in connection with various embodiments described herein. Alternative forms of the device 550 may also be used as will be understood by the skilled artisan. In the illustrated embodiment, the device 550 is presented as a digital imaging device (also referred to as a digital slide scanning apparatus, digital slide scanner, scanner, scanner system or a digital imaging device, etc.) that comprises one or more processors 555, one or more memories 565, one or more motion controllers 570, one or more interface systems 575, one or more movable stages 580 that each support one or more glass slides 585 with one or more samples 590, one or more illumination systems 595 that illuminate the sample, one or more objective lenses 600 that each define an optical path 605 that travels along an optical axis, one or more objective lens positioners 630, one or more optional epi-illumination systems 635 (e.g., included in a fluorescence scanner system), one or more focusing optics 610, one or more line scan cameras 615 and/or one or more area scan cameras 620, each of which define a separate field of view 625 on the sample 590 and/or glass slide 585. The various elements of the scanner system 550 are communicatively coupled via one or more communication busses 560. Although there may be one or more of each of the various elements of the scanner system 550, for simplicity in the description, these elements will be described in the singular except when needed to be described in the plural to convey the appropriate information.

The one or more processors 555 may include, for example, a central processing unit ("CPU") and a separate graphics processing unit ("GPU") capable of processing instructions in parallel or the one or more processors 555 may include a multicore processor capable of processing instructions in parallel. Additional separate processors may also be provided to control particular components or perform particular functions such as image processing. For example, additional processors may include an auxiliary processor to manage data input, an auxiliary processor to perform floating point mathematical operations, a special-purpose processor having an architecture suitable for fast execution of signal processing algorithms (e.g., digital signal processor), a slave processor subordinate to the main processor (e.g., back-end processor), an additional processor for controlling the line scan camera 615, the stage 580, the objective lens 225, and/or a display (not shown). Such additional processors may be separate discrete processors or may be integrated with the processor 555.

The memory 565 provides storage of data and instructions for programs that can be executed by the processor 555. The memory 565 may include one or more volatile and/or non-volatile computer-readable storage mediums that store the data and instructions, including, for example, a random access memory, a read only memory, a hard disk drive, removable storage drive, and the like. The processor 555 is configured to execute instructions that are stored in memory 565 and communicate via communication bus 560 with the various elements of the scanner system 550 to carry out the overall function of the scanner system 550.

The one or more communication busses 560 may include a communication bus 560 that is configured to convey analog electrical signals and may include a communication bus 560 that is configured to convey digital data. Accordingly, communications from the processor 555, the motion controller 570, and/or the interface system 575 via the one or more communication busses 560 may include both electrical signals and digital data. The processor 555, the motion controller 570, and/or the interface system 575 may also be configured to communicate with one or more of the various elements of the scanning system 550 via a wireless communication link.

The motion control system 570 is configured to precisely control and coordinate XYZ movement of the stage 580 and the objective lens 600 (e.g., via the objective lens positioner 630). The motion control system 570 is also configured to control movement of any other moving part in the scanner system 550. For example, in a fluorescence scanner embodiment, the motion control system 570 is configured to coordinate movement of optical filters and the like in the epi-illumination system 635.

The interface system 575 allows the scanner system 550 to interface with other systems and human operators. For example, the interface system 575 may include a user interface to provide information directly to an operator and/or to allow direct input from an operator. The interface system 575 is also configured to facilitate communication and data transfer between the scanning system 550 and one or more external devices that are directly connected (e.g., a printer, removable storage medium, etc.) or external devices such as an image server system, an operator station, a user station, and an administrative server system that are connected to the scanner system 550 via a network (not shown).

The illumination system 595 is configured to illuminate a portion of the sample 590. The illumination system 595 may include, for example, a light source and illumination optics. The light source could be a variable intensity halogen light source with a concave reflective mirror to maximize light output and a KG-1 filter to suppress heat. The light source could also be any type of arc-lamp, laser, or other source of light. In an embodiment, the illumination system 595 illuminates the sample 590 in transmission mode such that the line scan camera 615 and/or area scan camera 620 sense optical energy that is transmitted through the sample 590. Alternatively, or additionally, the illumination system 595 may be configured to illuminate the sample 590 in reflection mode such that the line scan camera 615 and/or area scan camera 620 sense optical energy that is reflected from the sample 590. Overall, the illumination system 595 is configured to be suitable for interrogation of the microscopic sample 590 in any known mode of optical microscopy.

In an embodiment, the scanner system 550 optionally includes an epi-illumination system 635 to optimize the scanner system 550 for fluorescence scanning. Fluorescence scanning is the scanning of samples 590 that include fluorescence molecules, which are photon sensitive molecules that can absorb light at a specific wavelength (excitation). These photon sensitive molecules also emit light at a higher wavelength (emission). Because the efficiency of this photoluminescence phenomenon is very low, the amount of emitted light is often very low. This low amount of emitted light typically frustrates conventional techniques for scanning and digitizing the sample 590 (e.g., transmission mode microscopy). Advantageously, in an optional fluorescence scanner system embodiment of the scanner system 550, use of a line scan camera 615 that includes multiple linear sensor arrays (e.g., a time delay integration ("TDI") line scan camera) increases the sensitivity to light of the line scan camera by exposing the same area of the sample 590 to each of the multiple linear sensor arrays of the line scan camera 615. This is particularly useful when scanning faint fluorescence samples with low emitted light.

Accordingly, in a fluorescence scanner system embodiment, the line scan camera 615 is preferably a monochrome TDI line scan camera. Advantageously, monochrome images are ideal in fluorescence microscopy because they provide a more accurate representation of the actual signals from the various channels present on the sample. As will be understood by those skilled in the art, a fluorescence sample 590 can be labeled with multiple fluorescence dyes that emit light at different wavelengths, which are also referred to as "channels."

Furthermore, because the low and high end signal levels of various fluorescence samples present a wide spectrum of wavelengths for the line scan camera 615 to sense, it is desirable for the low and high end signal levels that the line scan camera 615 can sense to be similarly wide. Accordingly, in a fluorescence scanner embodiment, a line scan camera 615 used in the fluorescence scanning system 550 is a monochrome 10 bit 64 linear array TDI line scan camera. It should be noted that a variety of bit depths for the line scan camera 615 can be employed for use with a fluorescence scanner embodiment of the scanning system 550.

The movable stage 580 is configured for precise X-Y axes movement under control of the processor 555 or the motion controller 570. The movable stage may also be configured for movement in a Z axis under control of the processor 555 or the motion controller 570. The movable stage is configured to position the sample in a desired location during image data capture by the line scan camera 615 and/or the area scan camera. The movable stage is also configured to accelerate the sample 590 in a scanning direction to a substantially constant velocity and then maintain the substantially constant velocity during image data capture by the line scan camera 615. In an embodiment, the scanner system 550 may employ a high precision and tightly coordinated X-Y grid to aid in the location of the sample 590 on the movable stage 580. In an embodiment, the movable stage 580 is a linear motor based X-Y stage with high precision encoders employed on both the X and the Y axis. For example, very precise nanometer encoders can be used on the axis in the scanning direction and on the axis that is in the direction perpendicular to the scanning direction and on the same plane as the scanning direction. The stage is also configured to support the glass slide 585 upon which the sample 590 is disposed.

The sample 590 can be anything that may be interrogated by optical microscopy. For example, a glass microscope slide 585 is frequently used as a viewing substrate for specimens that include tissues and cells, chromosomes, DNA, protein, blood, bone marrow, urine, bacteria, beads, biopsy materials, or any other type of biological material or substance that is either dead or alive, stained or unstained, labeled or unlabeled. The sample 590 may also be an array of any type of DNA or DNA-related material such as cDNA, RNA or protein that is deposited on any type of slide or other substrate, including any and all samples commonly known as microarrays. The sample 590 may be a microtiter plate, for example a 96-well plate. Other examples of the sample 590 include integrated circuit boards, electrophoresis records, petri dishes, film, semiconductor materials, forensic materials, and machined parts.

Objective lens 600 is mounted on the objective positioner 630 which, in an embodiment, may employ a very precise linear motor to move the objective lens 600 along the optical axis defined by the objective lens 600. For example, the linear motor of the objective lens positioner 630 may include a 50 nanometer encoder. The relative positions of the stage 580 and the objective lens 600 in XYZ axes are coordinated and controlled in a closed loop manner using motion controller 570 under the control of the processor 555 that employs memory 565 for storing information and instructions, including the computer-executable programmed steps for overall operation of the scanning system 550.

In an embodiment, the objective lens 600 is a plan apochromatic ("APO") infinity corrected objective with a numerical aperture corresponding to the highest spatial resolution desirable, where the objective lens 600 is suitable for transmission mode illumination microscopy, reflection mode illumination microscopy, and/or epi-illumination mode fluorescence microscopy (e.g., an Olympus 40×, 0.75 NA or 20×, 0.75 NA). Advantageously, objective lens 600 is capable of correcting for chromatic and spherical aberrations. Because objective lens 600 is infinity corrected, focusing optics 610 can be placed in the optical path 605 above the objective lens 600 where the light beam passing through the objective lens becomes a collimated light beam. The focusing optics 610 focus the optical signal captured by the objective lens 600 onto the light-responsive elements of the line scan camera 615 and/or the area scan camera 620 and may include optical components such as filters, magnification changer lenses, and/or the like. The objective lens 600 combined with focusing optics 610 provides the total magnification for the scanning system 550. In an embodiment, the focusing optics 610 may contain a tube lens and an optional 2× magnification changer. Advantageously, the 2× magnification changer allows a native 20× objective lens 600 to scan the sample 590 at 40× magnification.

The line scan camera 615 comprises at least one linear array of picture elements ("pixels"). The line scan camera may be monochrome or color. Color line scan cameras typically have at least three linear arrays, while monochrome line scan cameras may have a single linear array or plural linear arrays. Any type of singular or plural linear array, whether packaged as part of a camera or custom-integrated into an imaging electronic module, can also be used. For example, a 3 linear array ("red-green-blue" or "RGB") color line scan camera or a 96 linear array monochrome TDI may also be used. TDI line scan cameras typically provide a substantially better signal-to-noise ratio ("SNR") in the output signal by summing intensity data from previously imaged regions of a specimen, yielding an increase in the SNR that is in proportion to the square-root of the number of integration stages. TDI line scan cameras comprise multiple linear arrays. For example, TDI line scan cameras are available with 24, 32, 48, 64, 96, or even more linear arrays. The scanner system 550 also supports linear arrays that are manufactured in a variety of formats including some with 512 pixels, some with 1024 pixels, and others having as many as 4096 pixels. Similarly, linear arrays with a variety of pixel sizes can also be used in the scanner system 550. The salient requirement for the selection of any type of line scan camera 615 is that the motion of the stage 580 can be synchronized with the line rate of the line scan camera 615 so that the stage 580 can be in motion with respect to the line scan camera 615 during the digital image capture of the sample 590.

The image data generated by the line scan camera 615 is stored in a portion of the memory 565 and processed by the processor 555 to generate a contiguous digital image of at least a portion of the sample 590. The contiguous digital image can be further processed by the processor 555 and the processed contiguous digital image can also be stored in the memory 565.

In an embodiment with two or more line scan cameras 615, at least one of the line scan cameras 615 can be configured to function as a focusing sensor that operates in combination with at least one of the line scan cameras 615 that is configured to function as an imaging sensor. The focusing sensor can be logically positioned on the same optical axis as the imaging sensor or the focusing sensor may be logically positioned before or after the imaging sensor with respect to the scanning direction of the scanner system 550. In an embodiment with at least one line scan camera 615 functioning as a focusing sensor, the image data generated by the focusing sensor is stored in a portion of the memory 565 and processed by the one or more processors 555 to generate focus information to allow the scanner system 550 to adjust the relative distance between the sample 590 and the objective lens 600 to maintain focus on the sample during scanning. Additionally, in an embodiment the at least one line scan camera 615 functioning as a focusing sensor may be oriented such that each of a plurality of individual pixels of the focusing sensor is positioned at a different logical height along the optical path 605.

In operation, the various components of the scanner system 550 and the programmed modules stored in memory 565 enable automatic scanning and digitizing of the sample 590, which is disposed on a glass slide 585. The glass slide 585 is securely placed on the movable stage 580 of the scanner system 550 for scanning the sample 590. Under control of the processor 555, the movable stage 580 accelerates the sample 590 to a substantially constant velocity for sensing by the line scan camera 615, where the speed of the stage is synchronized with the line rate of the line scan camera 615. After scanning a stripe of image data, the movable stage 580 decelerates and brings the sample 590 to a substantially complete stop. The movable stage 580 then moves orthogonal to the scanning direction to position the sample 590 for scanning of a subsequent stripe of image data, e.g., an adjacent stripe. Additional stripes are subsequently scanned until an entire portion of the sample 590 or the entire sample 590 is scanned.

For example, during digital scanning of the sample 590, a contiguous digital image of the sample 590 is acquired as a plurality of contiguous fields of view that are combined together to form an image strip. A plurality of adjacent image strips are similarly combined together to form a contiguous digital image of a portion of the sample 590 or the entire sample 590. The scanning of the sample 590 may include acquiring vertical image strips or horizontal image strips. The scanning of the sample 590 may be either top-to-bottom, bottom-to-top, or both (bi-directional) and may start at any point on the sample. Alternatively, the scanning of the sample 590 may be either left-to-right, right-to-left, or both (bi-directional) and may start at any point on the sample. Additionally, it is not necessary that image strips be acquired in an adjacent or contiguous manner. Furthermore, the resulting image of the sample 590 may be an image of the entire sample 590 or only a portion of the sample 590.

In an embodiment, computer-executable instructions (e.g., programmed modules or other software) are stored in the memory 565 and, when executed, enable the scanning system 550 to perform the various functions described herein. In this description, the term "computer-readable storage medium" is used to refer to any media used to store and provide computer executable instructions to the scanning system 550 for execution by the processor 555. Examples of these media include memory 565 and any removable or external storage medium (not shown) communicatively coupled with the scanning system 550 either directly or indirectly (e.g., via a network).

FIG. 7B illustrates a line scan camera having a single linear array 640, which may be implemented as a charge coupled device ("CCD") array. The single linear array 640 comprises a plurality of individual pixels 645. In the illustrated embodiment, the single linear array 640 has 4096 pixels. In alternative embodiments, linear array 640 may have more or fewer pixels. For example, common formats of linear arrays include 512, 1024, and 4096 pixels. The pixels 645 are arranged in a linear fashion to define a field of view 625 for the linear array 640. The size of the field of view varies in accordance with the magnification of the scanner system 550.

FIG. 7C illustrates a line scan camera having three linear arrays, each of which may be implemented as a CCD array. The three linear arrays combine to form a color array 650. In an embodiment, each individual linear array in the color array 650 detects a different color intensity, (e.g., red, green, or blue). The color image data from each individual linear array in the color array 650 is combined to form a single field of view 625 of color image data.

FIG. 7D illustrates a line scan camera having a plurality of linear arrays, each of which may be implemented as a CCD array. The plurality of linear arrays combine to form a TDI array 655. Advantageously, a TDI line scan camera may provide a substantially better SNR in its output signal by summing intensity data from previously imaged regions of a specimen, yielding an increase in the SNR that is in proportion to the square-root of the number of linear arrays (also referred to as integration stages). A TDI line scan camera may comprise a larger variety of numbers of linear arrays. For example common formats of TDI line scan cameras include 24, 32, 48, 64, 96, 120 and even more linear arrays.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A slide rack gripper apparatus, comprising:
   a base;
   a finger mount attached to the base and configured to move along a first linear axis;
   a first motor attached to the base and configured to drive the finger mount along the first linear axis;
   a plurality of gripper fingers attached to the finger mount and configured to move along a second linear axis and a third linear axis, wherein each gripper finger extends longitudinally away from the second linear axis and comprises a slide rack engagement surface and the slide rack engagement surface of a first gripper finger faces the slide rack engagement surface of a second gripper finger along the third linear axis; and
   a second motor attached to the finger mount and configured to drive the plurality of gripper fingers along the second linear axis, the second motor further configured to drive the first gripper finger and the second gripper finger in opposite directions along the third linear axis to grasp or release a slide rack.

2. The slide rack gripper apparatus of claim 1, wherein the slide rack engagement surface of the first gripper finger comprises one or more finger protrusions configured to engage one or more slide rack protrusions extending from a first side of the slide rack.

3. The slide rack gripper apparatus of claim 2, wherein the one or more finger protrusions of the first gripper finger are configured to grasp the one or more slide rack protrusions extending from the first side of the slide rack when the slide rack is positioned at an angle relative to a horizontal plane.

4. The slide rack gripper apparatus of claim 2, wherein the slide rack engagement surface of the second gripper finger comprises one or more finger protrusions configured to engage one or more slide rack protrusions extending from a second side of the slide rack.

5. The slide rack gripper apparatus of claim 4, wherein the one or more finger protrusions of the first gripper finger are configured to grasp the one or more slide rack protrusions extending from the first side of the slide rack when the slide rack is positioned at an angle relative to a horizontal plane.

6. The slide rack gripper apparatus of claim 1, wherein each of the plurality of gripper fingers comprises one or more finger protrusions on its respective slide rack engagement surface, the one or more finger protrusions configured to engage one or more slide rack protrusions extending from a side of the slide rack.

7. The slide rack gripper apparatus of claim 6, wherein the one or more finger protrusions of each of the plurality of gripper fingers are configured to grasp the one or more slide rack protrusions extending from the side of the slide rack when the slide rack is positioned at an angle relative to a horizontal plane.

8. The slide rack gripper apparatus of claim 1, wherein the first linear axis is orthogonal to the second linear axis and the third linear axis.

9. The slide rack gripper apparatus of claim 1, wherein the second linear axis is orthogonal to the first linear axis and the third linear axis.

10. The slide rack gripper apparatus of claim 1, wherein the third linear axis is orthogonal to the first linear axis and the second linear axis.

11. The slide rack gripper apparatus of claim 1, wherein each linear axis is orthogonal to the other two linear axes.

12. The slide rack gripper apparatus of claim 1, further comprising a slide retainer extending along the second linear axis and configured the secure one or more glass slides in the slide rack.

13. The slide rack gripper apparatus of claim 1, further comprising a slide rack platform configured to support the slide rack after removal of the slide rack from a slide rack carousel.

14. The slide rack gripper apparatus of claim 1, further comprising one or more slide rack sensors secured to the finger mount, the slide rack sensors being configured to sense the presence of the slide rack.

15. A slide rack gripper apparatus, comprising:
(a) a base defining a gross movement axis;
(b) a finger mount extending from the base and being configured to translate along the gross movement axis;
(c) a first motor in communication with the base, the first motor being configured to drive translation of the finger mount along the gross movement axis;
(d) a plurality of gripper fingers, each gripper finger extending from a portion of the finger mount, each gripper finger defining a slide rack engagement surface, the slide rack engagement surface of a first gripper finger being oriented to face the slide rack engagement surface of a second gripper finger; and
(e) a second motor in communication with the finger mount, the second motor being configured to drive the plurality of gripper fingers along a first fine movement axis and a second fine movement axis, the second motor being further configured to drive the first gripper finger and the second gripper finger in an opposing direction along the second fine movement axis to grasp or release a slide rack, the first motor being configured to remove the slide rack from a slide rack carousel or insert the slide rack into the slide rack carousel along the gross movement axis.

16. The slide rack gripper apparatus of claim 15, the gross movement axis being perpendicular to both the first fine movement axis and the second fine movement axis.

17. The slide rack gripper apparatus of claim 15, the first gripper finger and the second gripper finger extending perpendicularly relative to the first fine movement axis.

18. A slide rack gripper apparatus, comprising:
(a) a base defining a first linear axis;
(b) a finger mount extending from the base and being configured to translate along the first linear axis;
(c) a first motor in communication with the base, the first motor being configured to drive translation of the finger mount along the first linear axis;
(d) a finger assembly movably secured to the finger mount, the finger assembly including a first gripper finger and a second gripper finger, the finger assembly being configured to move along a second linear axis, the first gripper finger and the second gripper finger being configured to move along a third linear axis, the first gripper finger defining one or more first finger protrusions, the second gripper finger defining one or more second finger protrusions;
(e) a second motor in communication with the finger mount, the second motor being configured to drive the finger assembly along the second linear axis, the second motor being further configured to drive the first gripper finger and the second gripper finger in opposing directions along the third linear axis to grasp or release a slide rack, the one or more first finger protrusions and the one or more second finger protrusions being configured to gasp one or more slide rack protrusions of the slide rack when the one or more slide rack protrusions are oriented obliquely relative to the second linear axis.

19. The slide rack gripper of claim 18, the base defining a first travel distance along the first linear axis, the first gripper finger and the second gripper finger defining a second travel distance along the third linear axis, the first travel distance being greater than the second travel distance.

20. The slide rack gripper of claim 18, the first linear axis being oriented parallel relative to a radial axis of a slide rack carousel such that movement of the finger amount along the first linear axis is configured to move the finger assembly into and out of the slide rack carousel.

* * * * *